United States Patent [19]

Ciliberti et al.

[11] Patent Number: 4,735,638
[45] Date of Patent: Apr. 5, 1988

[54] FILTER UNIT FOR USE AT HIGH TEMPERATURES

[75] Inventors: David F. Ciliberti, Murrysville Boro; Thomas E. Lippert, Murrysville, both of Pa.

[73] Assignee: The United States of America as represented by the United States Department of Energy, Washington, D.C.

[21] Appl. No.: 932,115

[22] Filed: Nov. 18, 1986

[51] Int. Cl.[4] ............................................. B01D 46/04
[52] U.S. Cl. ........................................ 55/302; 55/498; 55/507; 55/523
[58] Field of Search ................... 55/96, 282, 283, 302, 55/378, 498, 507, 523

[56] References Cited

U.S. PATENT DOCUMENTS

| Re. 24,954 | 3/1961 | Church | 183/61 |
|---|---|---|---|
| 2,707,051 | 4/1955 | Mailhot et al. | 55/523 X |
| 2,892,510 | 6/1959 | Wygant | 55/523 X |
| 2,892,512 | 6/1959 | Watts et al. | 55/523 X |
| 3,055,745 | 9/1962 | Drummond et al. | 23/288 |
| 3,073,097 | 1/1963 | Hallett et al. | 55/283 |
| 3,377,783 | 4/1968 | Young | 55/302 |
| 3,436,898 | 4/1969 | Kaess et al. | 55/523 X |
| 3,513,638 | 5/1970 | Young | 55/273 |
| 3,608,282 | 9/1971 | Ririe | 55/523 X |
| 4,028,254 | 6/1977 | Shufflebarger et al. | 55/498 X |
| 4,271,977 | 6/1981 | Saigne | 55/523 X |
| 4,343,318 | 8/1982 | Ciliberti | 55/302 |
| 4,398,931 | 8/1983 | Shevlin | 55/341 |

FOREIGN PATENT DOCUMENTS

| 600223 | 6/1960 | Canada | 55/523 |
|---|---|---|---|
| 481649 | 6/1953 | Italy | 55/523 |
| 119412 | 9/1980 | Japan | 55/523 |
| 137021 | 10/1980 | Japan | 55/523 |

OTHER PUBLICATIONS

"How Hot Gas Cleaning Improves the Economics of Electricity-from-Coal"; G. P. Reed, *Filtration and Separation*, pp. 120–124 (Mar./Apr. 1984).

"Comparison of High Temperature Gas Particulate Collectors for Low Level Radwaste Incinerator Volume Reduction Systems"; R. L. Moscardini, R. M. Waters, J. R. Johnston and J. F. Zievers, presented at Waste Management '83, Feb. 27–Mar. 3, 1983.

*Primary Examiner*—Robert Spitzer
*Attorney, Agent, or Firm*—D. C. Abeles

[57] ABSTRACT

A filtering unit for filtering particulates from high temperature gases uses a spiral ceramic spring to bias a ceramic, tubular filter element into sealing contact with a flange about an aperture of a metallic tube sheet. The ceramic spiral spring may contact the upper edge of the filter element and be restrained by a stop member spaced from one end of the tube sheet, or the spring may contact the bottom of the filter element and be restrained by a support member spaced from the opposite end of the tube sheet. The stop member and support member are adjustably secured to the tube sheet. A filtering system uses the ceramic spiral spring to bias a plurality of ceramic, tubular filter elements in a respective plurality of apertures in a tube sheet which divides a vessel into upper and lower enclosed sections.

30 Claims, 5 Drawing Sheets

FILTER UNIT FOR USE AT HIGH TEMPERATURES

The present invention was made under government contract DEAC21-84MC21338.

CROSS REFERENCE TO RELATED APPLICATION

Reference is hereby made to a copending application of the present inventors having related subject matter, which is assigned to the assignee of the present invention, said application entitled "HOT GAS CROSS FLOW FILTERING MODULE" filed Nov. 12, 1986 as Ser. No. 930,218.

BACKGROUND OF THE INVENTION

In many high temperature gas filtering processes, where particulate material is removed from a hot gaseous stream, such as in coal conversion systems and cogeneration systems, ceramic, tubular filter elements are used which are supported in apertures in a tube sheet. The ceramic, tubular filter elements are candle-shaped bodies that are formed from a ceramic material and have porous walls that enable the passage of gases through the walls to an interior chamber from which the filtered gases are discharged through an open top of the filter element, while the particulates are collected on the outer surface of the porous walls. At predetermined intervals, when the passage of the gases through the porous walls is retarded due to buildup of particulates on the outer surface of the porous walls, a blow-back system is activated which directs a pressurized flow of a gas into the interior chamber through the open top of the filter element and through the porous walls, in a direction opposite to that of the hot gases being filtered, to dislodge the collected particulates from the outer surface of the filter element and clean the filter for further use.

Such filtering systems are known in the art, but a problem exists in providing an adequate seal between the ceramic, tubular which the filter elements are supported. The seal is difficult because it must be effected between rigid porous ceramic materials that comprise the filter elements and metallic mountings or tube sheets. These seals are subjected to diverse forces and must provide a seal under various stresses. For example, such a seal must evidence an ability to maintain sealing loads at elevated temperatures; have the ability to accommodate considerable differential motion of the components due to mechanical loads as well as differential thermal expansion of the components; have the ability to accommodate vibrations in the system; have the ability to maintain sealing force under conditions of changing gasketing properties and deformations in the easily after prolonged exposure to high temperatures and possibly corrosive gaseous atmospheres.

In order to prevent passage of unfiltered gases or particulates between the metallic tube sheet and the ceramic, tubular filter elements supported thereby, a gasketing material is disposed therebetween. The gasketing material cushions the contact between the ceramic, tubular filter element and the metallic tube sheet and provides a barrier to the passage of gases and/or particulates. The use of metallic springs to bias the ceramic, tubular filter element against the gasket, and thus against the tube sheet has been proposed. In a copending application, Ser. No. 817,704 filed Jan. 10, 1986, entitled "Apparatus and Process for Filtering High Temperature Gas Streams" filed in the names of Gordon Isrealson, J. Schwab, and the present inventors, assigned to the assignee of the present invention, for example, the use of a wave spring is proposed to bias the top portion of a filter element towards a gasket in a tube sheet. These types of seals are ordinarily effective using metallic springs of appropriate characteristics. Applications that require high temperature sealing, however, may not be serviced by simple metallic springs because the metals display a sharp drop in modulus of elasticity and become soft and yielding at temperatures in the range of 700°–900° C. When such properties are lost, the spring biasing action becomes ineffective.

Current technology usually employs one of three methods for effective sealing under such high temperature conditions.

The assembly can be spring loaded using external studs, rods and springs. In this type of system, the casing is spring loaded against the ceramic interior which operates at high temperature. The springs and casing are insulated and are not directly exposed to thB high temperature of the internal ceramic component. In this application, the externally applied load also serves the additional function of placing the ceramic body in a state of compression that greatly reduces mechanical failures due to internal pressure which can cause delamination of the body in tension. A commercial implementation of this technique, is available from GTE Sylvania which uses an externally loaded system in its line of recuperative heat exchangers. A major drawback of this mounting system is that it greatly limits the size and geometry of the assembly and also limits a unit to low pressure applications since the metallic casing is unsealed and incapable of supporting large pressure loads without significant leaking.

In recent developments, the very large surface area to volume ratio of the cross flow configuration has been exploited in its use as a high temperature, high pressure (HTHP) filter for application in advanced coal conversion technologies such as pressurized fluid bed combustion (PFBC) and pressurized fluid bed gasification of coal. These applications are described in U.S. Pat. No. 4,343,631, and in the above-identified cross-reference related application of the present inventors, both of which are assigned to the assignee of the present invention, and both of which are incorporated by reference herein. Early methods for sealing a ceramic cross flow filter, as illustrated in FIG. 7 of U.S. Pat. No. 4,343,631 relied on a metallic plate being placed across the back (sealed) end of the filter and the use of threaded studs to subsequently pull the filter element tightly up to a gasketed manifold thereby forming a dust tight seal. Difficulties have been experienced with this method of mounting because of differential thermal expansion of the studs relative to the ceramic. This has caused frequent failure of the seal because of a gradual loosening of the assembly upon thermal cycling.

The more recent embodiment of this general concept has been disclosed in said above-identified cross-reference related application In this system, methods have been provided for the incorporation of a flange on the front sealing face of the element which has been mounted in the "face down" orientation so as to minimize the gravity loads on the seal of the unit. In this system, the problem of loosening are mitigated, but not eliminated, by keeping the clamping stud length at a minimum, and thereby minimizing total differential growth of the clamping member. Problems do exist in this sealing method since it requires a bolting force to be applied to the ceramic flange directly, or for the sealing force to be transmitted through the compression of fibrous ceramic gasketing material. Loading the retaining flange directly onto the ceramic flange is quite difficult because the ceramic member is so brittle that is likely to crack and cause failure. When a layer of ceramic gasketing is used to cushion and transmit the sealing force to the flange, there is the likelihood that the gasketing material will lose its resiliency after long term exposure to high temperature and repeated thermal and mechanical cycling. When this has occurred, the seal is compromised and rapid deterioration of the closure ensues.

Figure 1:
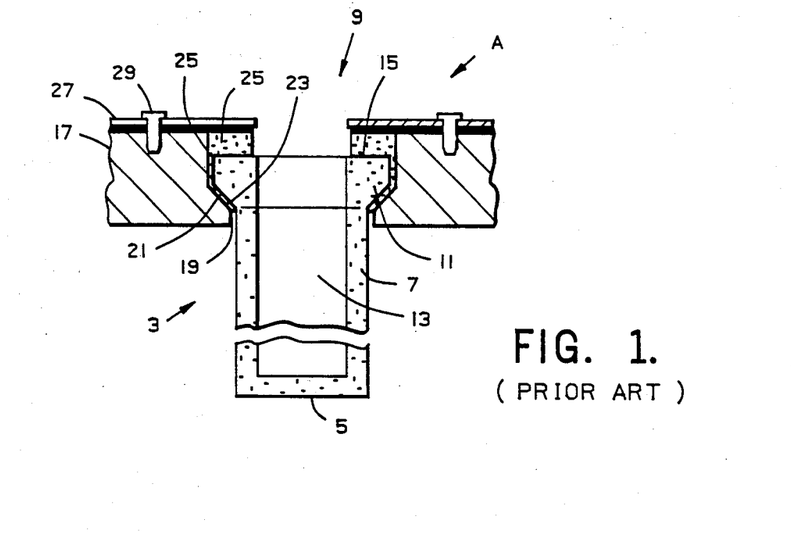
FIG. 1 is an elevational view, illustrated partly in cross section, of a prior art filter unit where the filter element is sealed to a tube sheet using a bolted compression plate.
Figure 2:
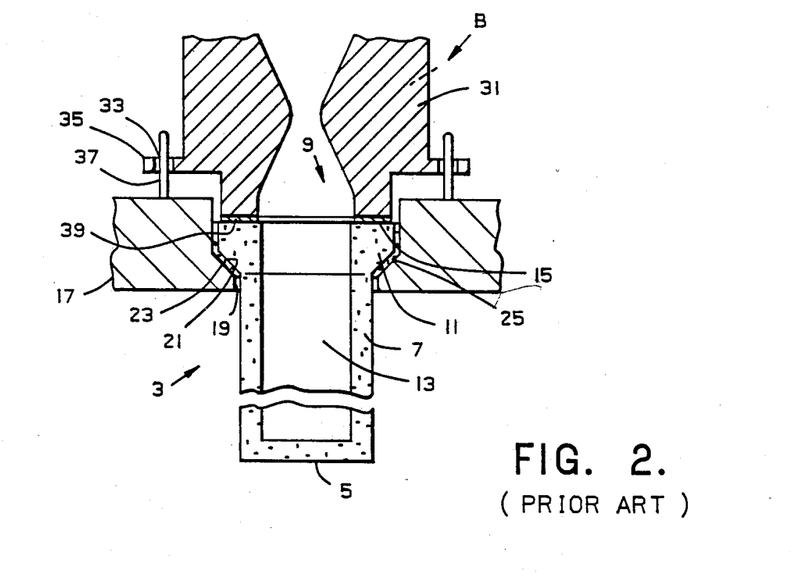
FIG. 2 is an elevational view, illustration partly in cross section, of another prior art filter unit where the filter element is sealed to the tube sheet by a sealing force exerted by a weight atop the filter element.

Applications where ceramic, tubular filter elements are to be sealed to metallic tube sheets, as presently known, are illustrated in FIGS. 1 and 2 of the present application. In these applications, a plurality of flanged ceramic, tubular filter elements are required to be sealed in a large metallic tube sheet. As illustrated in FIG. 1, a filter unit A has a ceramic, tubular filter element 3 which is comprised of a hollow cylindrical member that has a closed bottom 5, side walls 7, and an open top 9 at the upper region 11 thereof, the open top exposing a hollow interior or chamber 13 of the element at the top edge 15 of the side walls. The tube sheet 17 comprises a metallic support which supports the ceramic, tubular filter element in an aperture 19, with the walls of the tube sheet about the aperture 19 having an inwardly directed flange 21 upon which an outwardly extending shoulder 23 about the upper region 11 of the ceramic, tubular filter element resets, with a gasket 25 situated between the flange 21 and the shoulder 23. In order to seal the ceramic, tubular filter element 3 to the tube sheet 17, a gasket compression seal is formed by engagement of circular gasket 25 against the top edge 15 of the ceramic, tubular filter element using a compression plate 27 that is bolted to the tube sheet 17 by bolts 29. In another known embodiment, as illustrated in FIG. 2, the filter unit B uses a seal which comprises placement of a metallic cylindrical hollow member 31, as a weight, which may have apertures 33 through a flange 35 thereof, through which positioning posts 37, attached to the surface of the tube sheet 17, may pass. The placement of the weight, on a gasket 39 between the weight and the top edge 15 of the ceramic tubular filter element 3, provides a constant sealing force which is independent of thermal expansion considerations. A primary problem with such a weighted system is that the filter elements typically require a relatively large weight to provide the required sealing force as these filter elements are operated at a significant pressure drop. It is not uncommon to require 20 to 30 pounds weight on each filter element, and this is typically accomplished by using steel weights that are roughly 2 to 3 inches in diameter and 12 to 18 inches long. This greatly affects the high temperature design of the tube sheet which must carry the additional static load and complicates the manifolding of pulse jet cleaning manifolding.

It is an object of the present invention to provide a filter unit wherein a ceramic, tubular filter element is sealed in an opening of a metallic tube sheet by a spring loaded means for use in filtering applications at high temperatures of 700° C. up to in excess of 1000° C.

It is another object of the present invention to provide a filter unit which has a seal between a ceramic, tubular filter element and a metallic tube sheet that can accommodate the differential motion associated with the thermal cycling of component assemblies in high temperature gas filtering operations.

BRIEF SUMMARY OF THE INVENTION

A filtering unit for the filtering of particulates from a high temperature gas stream uses a ceramic spiral spring to bias a ceramic, tubular filter element into sealing contact with a flange about an aperture of a metallic tube sheet.

In one embodiment, the upper region of the ceramic, tubular filter element has a shoulder thereon which contacts the flange having a complementary bevelled surface, with the ceramic spiral spring coaxially positioned into contact with the upper edge of the ceramic tubular filter element by use of a stop member which is spaced from the open top of the filter element. Adjustable securing means are used to connect the stop member to the tube sheet so as to bias the spring against the top of the filter element.

In another embodiment, the upper region of the ceramic tubular filter element is biased into contact with the flange by use of a ceramic spiral spring which is disposed between the closed bottom of the filter element and a support member that is spaced from the bottom of the filter element. Adjustable securing means are provided to connect the support plate to the tube sheet so as to bias the spring against the bottom of the filter sheet.

A filtering system which incorporates the filter units of the present invention contains a plurality of ceramic, tubular filter elements sealed in a plurality of apertures through a tube sheet that divides a filtering vessel into upper and lower sections. The ceramic spring sealing members are provided to seal the filter elements to the tube sheet. A blowback system is provided to periodically clean the filter by a pressurized purge gas.

DETAILED DESCRIPTION

Figure 3:
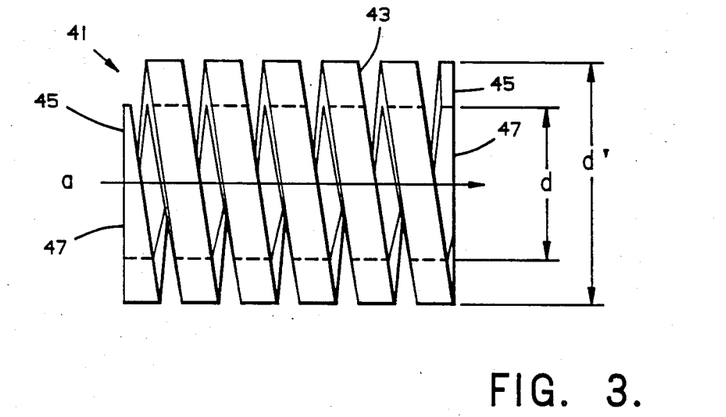
FIG. 3 is a schematic illustration of a ceramic spiral spring usable in the filter unit of the present invention.

The present invention uses a ceramic spiral spring as a biasing means to seal a ceramic, tubular filter element to a metallic tube sheet. Such a ceramic spiral spring 41 is illustrated in FIG. 3, wherein a ceramic spiral spring, such as formed from high purity alumina, has helical turns 43, which turn about on axis a of the spring, the spring having an inside diameter d, which forms a hollow interior of the spring, and an outside diameter d'. The ends 45 of the spring 41 are ground flat so as to provide a bearing surface 47.

The ceramic springs that are usable as the securing means of the present invention are suitable where small deflections are adequate, and which would not be too brittle. Such ceramic springs can be formed such as by winding a ceramic clay in the green or unfired state on a mandrel and subsequently firing the helical shape, or by grinding a helical cut in a length of standard ceramic tubing.

Such ceramic springs can be formed from materials such as alumina, silicon carbide, silicon nitride, or other ceramic material that will withstand temperatures of 900° C. or more. For example, ceramic springs of alumina material were ground from a 60 mm outside diameter by 45 mm inside diameter alumina tube. The springs were approximately 75 mm in length and had six turns (4.7×9 mm cross section) including turns that were ground to allow the ends of the spring to be flat. Tests performed on these ceramic springs indicate that the effective spring constant is 134 N/mm (Newton/mm) or 750 lbf/inch. One of the ceramic springs was tested to failure in order to determine the maximum deflection that could be expected from this design, which spring reached a deflection of 6.1 mm (0.24 in.) before failing.

By using standard spring formulas, such as that described in Roark, R. J. "Formulas for Stress and Strain,"4th Ed., McGraw-Hill (p. 209) the force deflection characteristics of the ceramic spring can be analyzed. The following formula has been found to be usable in predicting the performance of helical, rectangular cross section springs:

$$S = \frac{2\pi PR^3 N}{Ga^3} \left[ \frac{1}{b/3 - .209a \left[ \text{Tanh} \left( a\pi/2b \right) + 0.004 \right]} \right]$$

where,
S = Compression (in.)
P = Force (lbf)
R = Radius of Spring (in.)
N = Number of Turns
G = Shear Modulus (psi)
a = Smaller Dimensions of Cross Section (in.)
b = Larger Dimensions of Cross Section (in.)
Using this formula, dimensions were provided to make further ceramic springs of alumina that were tested and found to have a force of 50 lbf at a deflection of 0.25 in.

The resultant springs were tested and found to have a force of 48 lbf at a deflection of 0.25 in.

By altering the ceramic spring cross section, number of turns, diameter, etc. a wide range of loading forces and deflections are possible even with materials as brittle as high purity alumina.

Figure 4:
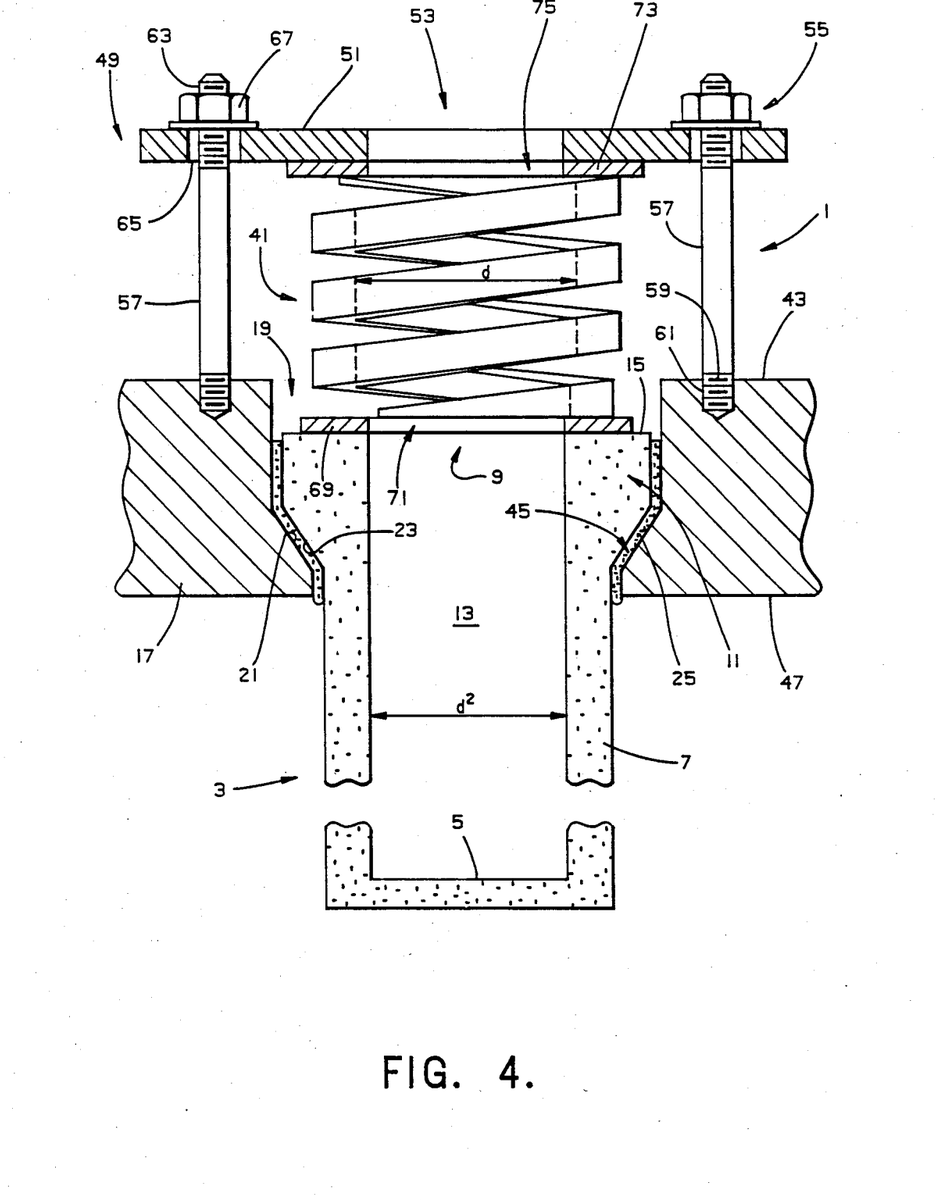
FIG. 4 is an elevational view, partly in cross section, of an embodiment of the filter unit of the present invention wherein a ceramic spiral spring is biased against the top of a ceramic, tubular filter element to seal the upper region of the filter element to a metallic tube sheet.

In the embodiment of the present invention illustrated in FIG. 4, filtering unit 1 is provided wherein a ceramic, tubular filter element is supported in an aperture of a tube sheet and biased by a ceramic spiral spring from the top of the filter element to seal the same in the tube sheet. The ceramic, tubular filter element has a bottom wall 5, side walls 7 and an open top 9 at the upper region 11 thereof. An interior open chamber 13 is formed in the ceramic, tubular filter element having a diameter d², and the top edge 15 of the side walls is disposed within the aperture 19 of tube sheet 17 adjacent one surface 43 of the tube sheet where filtered gases are discharged. The walls of the tube sheet 17 about apertures 19 have an inwardly extending flange 21. The ceramic, tubular filter element 3, at the upper region 11 thereof, has an outwardly extending shoulder 23 which nests on a bevelled portion 45 of the flange 21, which bevelled portion 45 is complementary to the shoulder 23 on the ceramic, tubular filter element. This bevelled portion 45 is preferably of an arcuate shape so as to provide a ball-and-socket type of engagement between the shoulder 23 and the flange 21. A gasket 25 is provided between the shoulder 23 and the bevelled portion 45 of the flange 21 of the tube sheet 17. The bottom 5 and side walls 7 of the ceramic, tubular filter element 3, upon support by the tube sheet 17, through aperture 19, are exposed to the area of the opposite side 47 of tube sheet 17, where a particulate-containing high temperature gas stream to be filtered is present.

A ceramic spiral spring 41 is disposed, in a compressed state, atop the ceramic tubular filter element 3, the spring coaxial therewith so as to bias the upper region 11 of the ceramic, tubular filter element 3 into contact with the flange 21 of the tube sheet 17. In order to engage the ceramic spiral spring at this location, a stop member 49 is provided, and the ceramic spiral spring 41 disposed between the stop member 49 and the open top 9 of the ceramic, tubular filter element. As illustrated, the stop member 49 may comprise a plate 51 that has an aperture 53 therethrough, communicating with the interior of the ceramic spiral spacing bounded by the walls of the spring forming the interior diameter d of the spring, with adjustable securing means 55 provided to connect the plate 51 to the tube sheet 17. The adjustable securing means may comprise posts 57 secured to the tube sheet 17, such as by threads 59 in threaded bores 61 in the tube sheet, with an exposed opposite threaded end 63 provided on the posts 57, which pass through apertures 65 in the plate 51, upon which nuts 67 are threadably engaged.

In order to more evenly distribute the forces acting on the ceramic, tubular filter element by the ceramic spiral spring, a first force distribution member, such as ring 69 is provided between the ceramic spiral spring 41 and the top edge 15 of the ceramic, tubular filter element 3, the force distribution member 69 having an opening 71 therethrough which is coaxial with the ceramic spiral spring 41 and the ceramic, tubular filter element 3. Also, in order to more evenly distribute the forces acting on the plate 51 by the ceramic spiral spring 41, a second force distribution member, such as a flat ring 73 is provided between the plate 51 and ceramic spiral spring 41, the ring having an opening 75 therethrough communicating with the interior of the ceramic spiral spring and the aperture 53 in the plate 51.

In order to provide direct discharge of blowback gas from a port or line to the open top of the ceramic, tubular filter element through the ceramic spiral spring, a hollow cylinder (not shown) may be inserted axially into the interior of the spring with a flange on the cylinder resting on the upper surface of plate 51. This would close off the spacing between the ceramic spring spirals and provide direct charging of the blowback gas through the open top of the ceramic, tubular filter element into the interior open chamber thereof.

The actual method of mounting the spring may be varied but generally would consist of a fixture that can be loaded to a predetermined force, or to a predetermined deflection. In this embodiment, the stop member would grow due to thermal expansion in a hot gas environment, but the ceramic spiral spring would be rigid so that even in the extended conditions, adequate spring force would be applied to the top of the ceramic, tubular filter element. Typical spring loads required for sealing would be on the order of 200 to 400 N (45 to 90 lbf). Loads of this magnitude can easily be accommodated by high temperature metals such as RA 333 which has a 0.5% creep stress in 5000 hours of 3580 N/mm$^2$ (5.2 ksi) at 800° C. An arrangement of the nature would allow easy replacement or maintenance of the ceramic tubular filter element.

Figure 5:
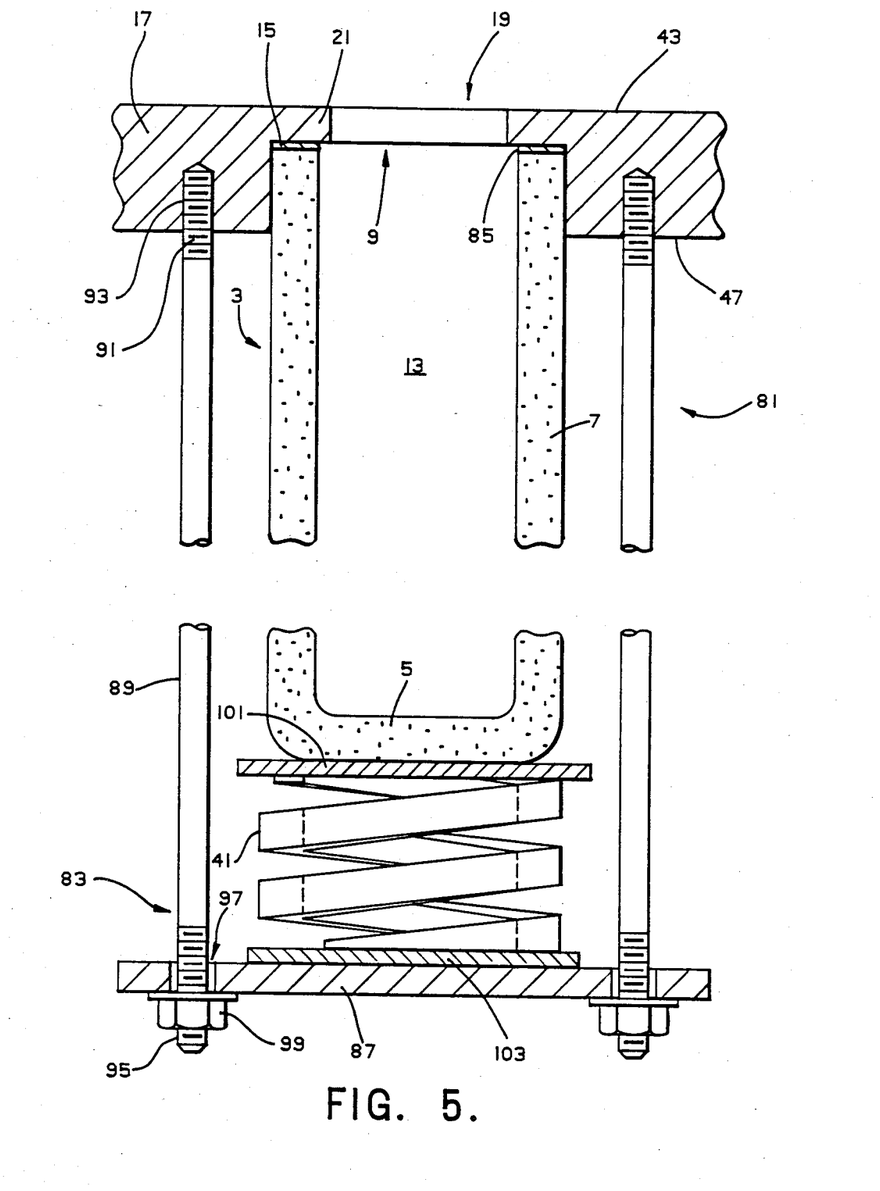
FIG. 5 is an elevational view, partly in cross section, of another embodiment of the present invention wherein a ceramic spiral spring is biased against the bottom of a ceramic, tubular filter element to seal the upper region of the filter element to a metallic tube sheet.

In another embodiment of the present invention illustrated in FIG. 5, a filtering unit 81 is provided wherein a ceramic, tubular filter element is supported in an aperture of a tube sheet and biased by a ceramic spiral spring from the bottom of the filter element to seal the same in the tube sheet. The ceramic, tubular filter element 3, with bottom wall 5, side walls 7 and open top 9 is supported with the top edge 15 of walls 7 biased into contact with the flange 21 of the tube sheet 17 by a ceramic spiral spring 41 disposed, in a compressed state, between a support member 83 that is spaced from the opposite surface 47 of the tube sheet 17. A gasket 85 is provided between the top edge 15 of the ceramic tubular filter element and the flange 21 of the tube sheet 17.

As illustrated, the support member 83 may comprise a plate 87, spaced from the opposite surface 47 of the tube sheet 17, which is secured to the tube sheet by threaded studs 89, the threaded studs 89 having a threaded end 91 that is threadably engaged in threaded bores 93 in the support plate 17, with an exposed opposite threaded end 95 which passes through apertures 97 in the plate 87, upon which nuts 99 are threadably engaged.

In order to more evenly distribute the forces acting on the ceramic, tubular filter elements by the ceramic spiral spring, a first force distribution member, such as plate 101, is provided between the ceramic spiral spring 41 and the bottom 5 of the ceramic, tubular filter element 3, while in order to more evenly distribute the forces acting on the support plate 87 by the ceramic spring 41, and act as a cushioning member, a second force distribution member, such as a plate 103, is provided between the plate 103 and the ceramic spiral spring 41.

This embodiment, wherein the ceramic, tubular filter element is sealed to the tube sheet using a bottom biasing ceramic spiral spring provides for the use of ceramic, tubular filter element that does not require a shoulder or flange on the upper region thereof. The elimination of the shoulder will enable easier manufacturing of the ceramic, tubular filter element and provide use of a less costly and more reliable filter element. While this is preferred, and is the embodiment illustrated in FIG. 5, the use of ceramic, tubular filter elements such as shown in FIG. 4 having an outwardly extending shoulder thereon could also be used in the bottom biasing embodiment of the present invention.

In this bottom biased embodiment, the ceramic spiral spring will be called upon to compensate for a much larger amount of thermal expansion since the tensioned metallic mounting studs are longer than in the top biased embodiment. It has been calculated that the expected differential growth between the studs and the ceramic, tubular filter element will be on the order of 10 mm (0.4 in.). The design of the ceramic spiral spring should be such that this growth can be accommodated and still maintain the required sealing load.

Figure 6:
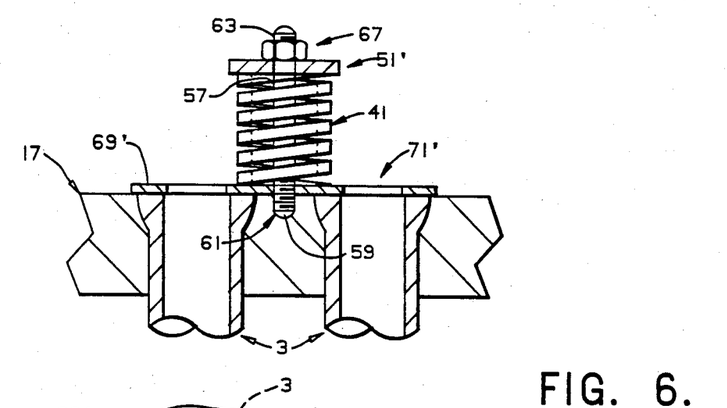
FIG. 6 is an elevational view partly in cross section, of an embodiment of the present invention where a single ceramic spiral spring is used to provide a bias against the tops of a plurality of ceramic, tubular filter elements to seal the same to a tube sheet.
Figure 7:
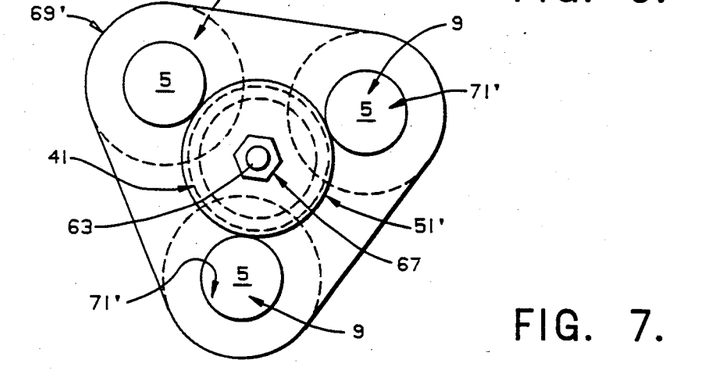
FIG. 7 is a plan view of the embodiment illustrated in FIG. 6.
Figure 8:
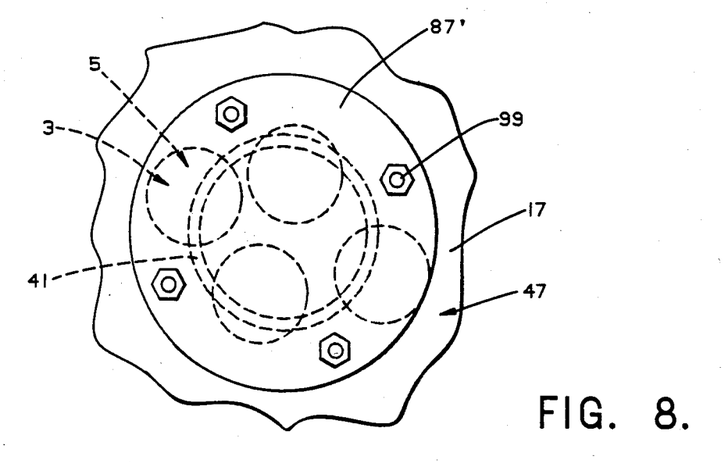
FIG. 8 is a schematic bottom view of an embodiment of the present invention where a single ceramic spiral spring is biased against the bottom of a plurality of ceramic, tubular filter elements to seal the same to a tube sheet.

As illustrated schematically in FIGS. 6 to 8, one large ceramic spiral spring may be used to bias a plurality of ceramic, tubular filter elements in sealing contact with a flange about the respective apertures in the tube sheet in which each of the ceramic, tubular filter elements is positioned. A top mounting of a select plurality of the ceramic tubular filters by a single ceramic spiral spring is illustrated in FIGS. 6 and 7. The ceramic spiral spring 41 would be biased by a stop member, such as compression plate 51', against the spring 41 which biases against force distribution plate 69', acting as a hold down plate against a plurality of ceramic, tubular filter elements 3, with an aperture 71' provided in plate 69' above each open top 9 of a filter for passage of filtered gases therethrough. The plate 51' is secured in place, with the spring 41 under compression, by use of a post 57, secured to the tube sheet 17, such as by threads 59 in a threaded bore 61 in the tubesheet and passes coaxially upwardly through the spring 41. An exposed opposite threaded end 63 on the post 57 has threaded thereon a nut 67, which can be adjusted to exert the desired compression on the spring. With a bottom mounting of a select plurality of the ceramic, tubular filter elements by a single spring, as illustrated in FIG. 8, the ceramic spiral spring 41 would be biased by a support member such as a large plate 87', against the spring 41 which biases a plurality of ceramic, tubular filter elements. The spring 41 is thus biased against a force distribution plate and the bottom 5 of each of a plurality of ceramic, tubular filter elements 3.

Figure 9:
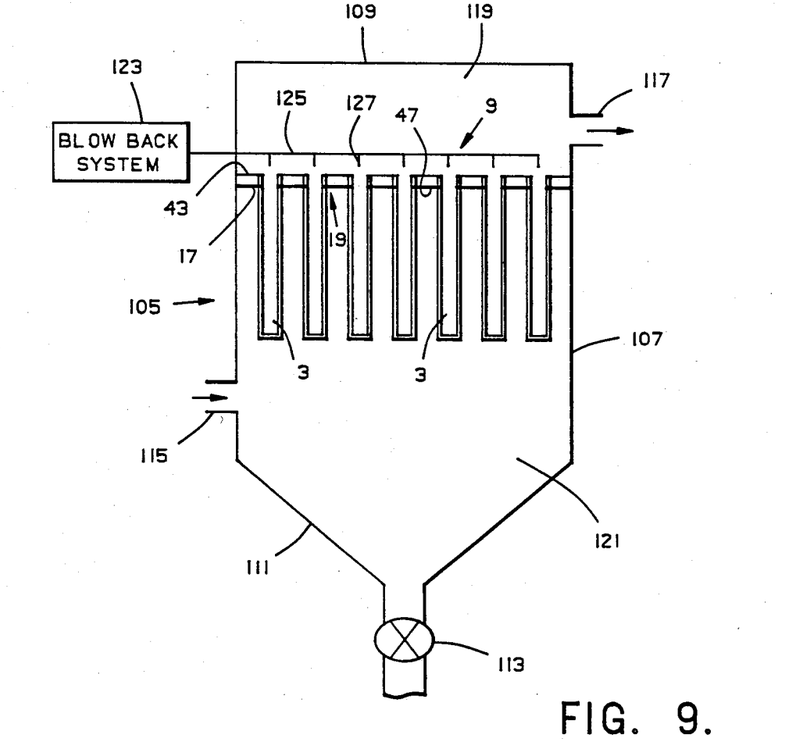
FIG. 9 is a schematic illustration of a filtering system incorporating the filter units of the present invention.

A filter system which incorporates the filter unit of the present invention is schematically illustrated in FIG. 9. Such filter systems are generally known, except for the means for sealing the ceramic, tubular filter elements in a tube sheet as provided herein. The filter system 105 comprises a vessel having walls 107, a closed top 109, and a generally frusto-conical bottom portion 111 which terminates in a discharge having a valve 113 therein for removal of collected particulates from the vessel. An inlet line 115 communicates through the lower portion of wall 107 of the vessel to the interior chamber thereof, while an outlet line 117 is provided in the wall 107 at the upper portion thereof. The tube sheet 17 extends across the interior chamber of the vessel to divide the same into upper and lower sections, with a plurality of ceramic, tubular filter elements 3 extending, vertically downwardly, through the apertures 19 of the tube sheet. The tube sheet 17, divides the vessel into an enclosed upper section 119, facing one surface 43 of the tube sheet 17, where filtered gases are collected from the open tops of the ceramic, tubular filter elements and discharged through outlet 117, and an enclosed lower section 121, facing opposite surface 47 of tube sheet 17, into which the ceramic, tubular filter elements 3 extend, with the closed bottom and side walls thereof exposed to the area of the vessel chamber where a particulate-containing, high temperature gas stream to be filtered is present. A system for cleaning the ceramic, tubular filter elements is provided, as is conventional, including a blowback system 123 from which pressurized gas is directed through lines 125 and then through ports or vertically disposed branch lines 127 which direct the pressurized gas, when desired, through the open tops 9 of the ceramic, tubular filter elements to dislodge collected solids from the outer surface of the walls thereof.

In operation of the filter system, a particulate-containing, high temperature gas stream, at a temperature of about 700° to 1000° C., is charged through inlet 115 into the lower section 121 of the vessel and the high temperature gases pass through the ceramic, tubular filter elements while the solid particulates collect on the outer walls and bottom thereof. The clean, filtered gases pass through the open tops 9 of the ceramic, tubular filter elements into the upper section 119 of the vessel and are discharged through outlet 117. When the flow of gases through the ceramic, tubular filter elements periodically slows to or below a predetermined rate, due to collection of solids on the outer surface thereof, the filter elements are cleaned by a purge of pressurized gas which is charged from ports 127 into the open tops of the ceramic, tubular filter elements and dislodge solids from the outer surface thereof, after which purge the filtering is continued. The solids that are dislodged from the filter elements are collected and periodically discharged through valve 113.

What is claimed is:

1. A filtering unit for the filtering of particulates from a particulate-containing high temperature gas stream comprising a ceramic, tubular filter element, having a closed bottom and side walls and an open top at the upper region thereof, disposed in an aperture in a tube sheet, the walls of said tube sheet about the aperture having an inwardly extending flange thereon, with the open top of said ceramic, tubular filter element adjacent one surface of the tube sheet where filtered gases are discharged, and the closed bottom and side walls exposed to the area of the opposite surface of the tube sheet where a particulate-containing high temperature gas stream to be filtered is present, wherein a ceramic spiral spring is provided at an end of said ceramic, tubular filter element to bias the upper region of the ceramic, tubular filter element into contact with said flange so as to seal the ceramic, tubular filter element to said flange on said tube sheet.

2. The filtering unit as defined in claim 1 wherein said ceramic, tubular filter element has an outwardly extending shoulder about the open top thereof, said inwardly directed flange has a bevelled portion thereof complementary with said shoulder, and wherein said ceramic spiral spring is disposed, coaxially with the ceramic, tubular filter element, between a stop member spaced from said one surface of said tube sheet and the open top of said ceramic, tubular filter element.

3. The filtering unit as defined in claim 2 wherein a gasket is provided between said outwardly extending shoulder of said ceramic tubular filter element and said bevelled portion of said inwardly directed flange.

4. The filtering unit as defined in claim 3 wherein said stop member comprises a plate, having an aperture therethrough communicating with the interior of said ceramic spiral spring, and adjustable securing means connecting said plate to the tube sheet.

5. The filtering unit as defined in claim 4 wherein said adjustable securing means comprises apertures in said plate and posts secured to the tube sheet, each post having an exposed threaded end which passes through the apertures of said plate, and nuts threadably engaged with said exposed threaded end.

6. The filtering unit as defined in claim 5 wherein a first force distribution member, comprising a flat ring having an opening therethrough is provided between the open top of said ceramic, tubular filter element and said ceramic spiral spring.

7. The filtering unit as defined in claim 6 wherein a second force distribution member, comprising a flat ring having an opening therethrough is provided between said plate and said ceramic spiral spring.

8. The filtering unit as defined in claim 1 wherein said ceramic spiral spring is disposed, coaxially with the ceramic, tubular filter element, between a support member spaced from the opposite surface of said tube sheet and the bottom of said ceramic, tubular filter element, and said top edge of the walls thereof confronts said flange.

9. The filtering unit as defined in claim 8 wherein a gasket is provided between said top edge and said flange.

10. The filtering unit as defined in claim 9 wherein said support member comprises a plate and said plate is secured to said tube sheet by adjustable securing means.

11. The filtering unit as defined in claim 10 wherein said adjustable securing means comprises apertures in said support plate and studs secured to the tube sheet, each stud having an exposed threaded end which passes through the apertures of said support plate, and nuts threadably engaged with the exposed threaded ends.

12. The filtering unit as defined in claim 11 wherein a first force distribution member is provided between said ceramic spiral spring and the bottom of said ceramic, tubular filter element.

13. The filtering unit as defined in claim 12 wherein a second force distribution member is provided between said ceramic spriral spring and said support member.

14. The filtering unit as defined in claim 8 wherein said ceramic, tubular filter element has an outwardly extending shoulder about the open top thereof.

15. A filtering unit as defined in claim 1 wherein a plurality of ceramic, tubular filter elements are provided, each of which is disposed in a respective aperture of a plurality of apertures through said tube sheet, with a ceramic spiral spring provided at the end of at least one of said plurality of ceramic, tubular filter elements.

16. A filtering unit as defined in claim 15 wherein a said ceramic spiral spring is provided for each of said plurality of ceramic, tubular filter elements.

17. A filtering unit as defined in claim 1, wherein a plurality of ceramic, tubular filter elements are provided, each of which is disposed in a respective aperture of a plurality of apertures through said tube sheet, and a single ceramic spiral spring is disposed between a stop member spaced from said one surface of said tube sheet and the open tops of a plurality of ceramic, tubular filter elements.

18. A filtering unit as defined in claim 1 wherein a plurality of ceramic, tubular filter elements are provided, each of which is disposed in a respective aperture of a plurality of apertures through the tube sheet, and a single ceramic spiral spring is disposed between a support member spaced from said opposite surface of said tube sheet and the bottoms of a plurality of said ceramic, tubular filter elements.

19. In a filter system having a vessel with side walls, closed top and closed bottom walls wherein a tube sheet divides said vessel into upper end lower sections, the upper section facing one surface of the tube sheet where filtered gases are collected and a lower section where a particulate-containing high temperature gas stream to be filtered is present, and wherein a plurality of ceramic, tubular filter elements, having open tops at the upper regions thereof, extend vertically downwardly through apertures in the tube sheet with open tops thereof facing said upper section and the closed bottom and side walls thereof exposed in said lower section, having an inlet line for said gas stream to said lower section and an outlet line for filtered gas from said upper section, with a flange provided about said apertures is said tube sheet, the improvement wherein a ceramic spiral spring is provided at an end of at least one of said plurality of ceramic, tubular filter elements to bias the upper region of the ceramic, tubular filter element into contact with said flange so as to seal the ceramic, tubular filter element to said flange on said tube sheet.

20. The filtering system as defined in claim 19 wherein said at least one ceramic, tubular filter element has an outwardly extending shoulder about the open top thereof, said inwardly directed flange has a bevelled portion thereof complementary with said shoulder, said ceramic spiral spring is disposed coaxially with said ceramic, tubular filter element, between a stop member spaced from said one surface of said tube sheet and the open top of said ceramic, tubular filter element, and wherein a gasket is provided between said outwardly extending shoulder of said ceramic, tubular filter element and said bevelled portion of said inwardly directed flange.

21. The filtering system as defined in claim 20 wherein said stop member comprises a plate having an aperture therethrough communicating with the interior of said ceramic spiral spring, and adjustable securing means connecting said plate to the tube sheet.

22. The filtering system as defined in claim 21 wherein said adjustable securing means comprises apertures in solid plate and posts secured to the tube sheet, each post having an exposed threaded end which passes through the apertures of said plate, and nuts threadably engaged with said exposed threaded end.

23. The filtering system as defined in claim 22 wherein a first fource distribution member, comprising a flat ring having an opening therethrough is provided between the open top of said ceramic, tubular filter element and said ceramic spiral spring, and a second force distribution member, comprising a flat ring having an opening therethrough is provided between said plate and said ceramic spiral spring.

24. The filtering system as defined in claim 19 wherein a single ceramic spiral spring is disposed between a stop member spaced from said one surface of said tube sheet and a select plurality of open tops of said ceramic, tubular filter elements to bias said select plurality of ceramic, tubular filter elements into contact with the flanges of said tube sheet.

25. The filtering system as defined in claim 19 wherein said ceramic spiral spring is disposed between a support member spaced from the opposite surface of said tube sheet and the bottom of said ceramic, tubular filter element, said top edge of the walls thereof confronts said flange, and a gasket is provided between said top edge and said flange.

26. The filtering system as defined in claim 25 wherein said support member comprises a plate and said plate is secured to said tube sheet by adjustable securing means.

27. The filtering system as defined in claim 26 wherein said adjustable securing means comprises apertures in said support plate and studs secured to the tube sheet, each stud having an exposed threaded end which passes through the apertures of said support plate, and nuts threadably engaged with the exposed threaded ends.

28. The filtering system as defined in claim 27 wherein a first force distribution member is provided between said ceramic spiral spring and the bottom of said ceramic, tubular filter element, and a second force distribution member is provided between said ceramic spiral spring and said support member.

29. The filtering system as defined in claim 19 wherein a single ceramic spring is disposed between a support member spaced from said opposite surface of said tube sheet and a select plurality of bottoms of said ceramic, tubular filter elements to bias said select plurality of ceramic, tubular filter elements into contact with the flanges of said tube sheet.

30. The filtering system as defined in claim 19 including a blowback system from which pressurized gas is directed through the open tops of the ceramic, tubular filter elements to dislodge collected solids from the outer surface of the walls thereof.

* * * * *